S. COLAHAN.
Machine for Cutting and Preparing Hay for Baling.
No. 46,993.  Patented March 28, 1865.
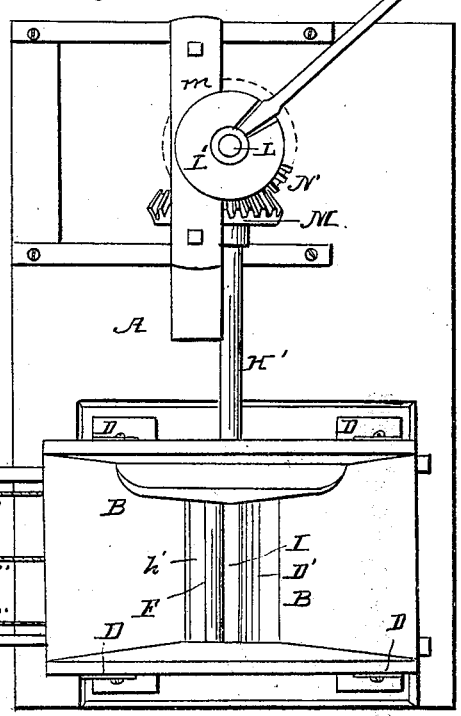
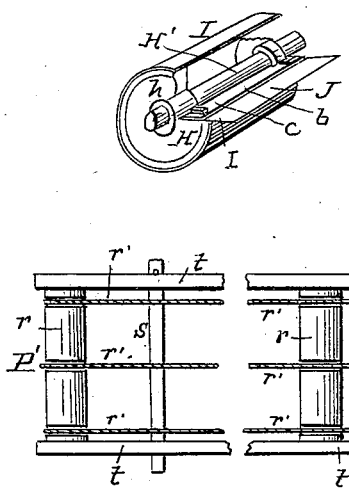
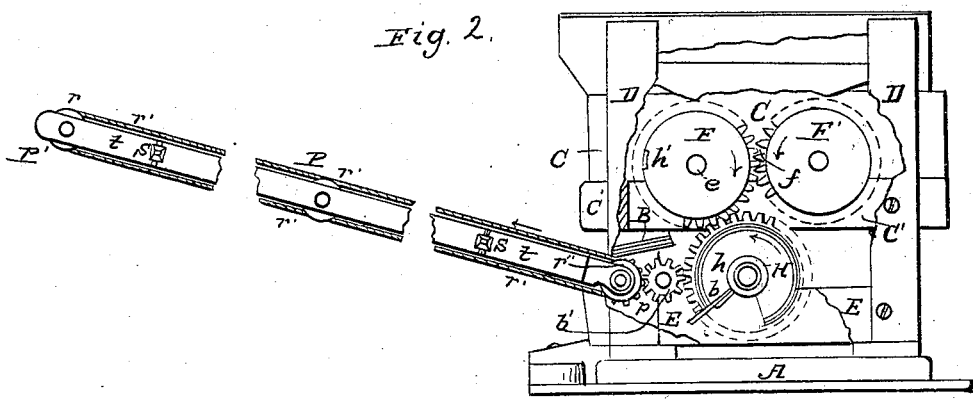
Witnesses:  Inventor

UNITED STATES PATENT OFFICE.

SAMUEL COLAHAN, OF CLEVELAND, OHIO.

MACHINE FOR CUTTING AND PREPARING HAY FOR BALING.

Specification forming part of Letters Patent No. 46,993, dated March 28, 1865.

*To all whom it may concern:*

Be it known that I, S. COLAHAN, of Cleveland, in the county of Cuyahoga and State of Ohio, have invented certain new and useful Improvements in Machines for Cutting and Preparing Hay and Straw for Baling; and I do hereby declare that the following is a full and complete description of the construction and operation of the same, reference being had to the accompanying drawings, making a part of this specification, in which—

Figure 1 is a plan view of the machine. Fig. 2 is a side view with part of the frame broken away to show the internal arrangement. Fig. 3 represents a detached section.

Like letters of reference refer to like parts in the different views.

My improvement relates to cutting and compressing hay or straw and discharging the same from the machine, ready for baling, by one continuous operation, as hereinafter described.

A is a platform, on which the different parts of the machine are arranged.

B is a hopper at one end, supported on a frame, C, that fits in between standards D on each side, and rests on cross-pieces C', secured to the standards. The standards are also bolted to cross-pieces E at the lower end and connected with suitable frame-work, securing them to the platform. Below the hopper are cylinders F and F', (shown in Fig. 2,) with cog-wheels f at one end, that work into each other. These cylinders are supported on the cross-pieces C', which form a frame or bed, the shafts e of the cylinders turning in boxes on the top of the frame. Underneath these cylinders, a little one side, so that the cog-wheel G will work in the cogs of the cylinder F, is a cutter-head, (seen at H in Fig. 2,) constructed as represented in Fig. 3, which is a perspective view of it detached, the cog-wheel G being secured to the shaft H' at one end of the sectional cylinder.

H' is the shaft of the cylinder H, which passes through and is secured to heads h in each end of it. To these heads is attached a hoop or circular plate, I, that extends between and over them, forming a cutter-head.

J is a blade or cutter, secured to the heads h by bolts or rivets c, a strip, b, being on the top, as represented. The blade extends out beyond the periphery of the cutter-head.

The shaft H' turns in boxes on the cross-pieces E. On one side the shaft H' extends along, as shown in Fig. 1, and is connected with the driving-power by means of which the cylinders are operated.

The driving-power consists of beveled gear-wheels M and N, that work in each other, one being on the end of the shaft H', and to the other is secured an upright shaft, L, that passes through a stationary plate secured to the frame m, on the top of which rests a plate, L', secured to the shaft to which the lever L'' is connected.

Moving the lever turns the shaft L, and by means of the beveled gearing revolves the shaft H', and with it the operating devices of the machine.

P is an endless apron or carrier connected to the lower part of the machine, as shown in Fig. 2. It is formed of rollers r, the journals of which turn in the side pieces, t, between which extend and are secured cross-pieces S. The journals of the inner roller, r'', turn in boxes on the frame, and at one end of this roller is a pinion, p, that works in the pinion p', which is revolved by the cog-wheel G on the shaft H', by means of which the carrier is operated. Over the rollers r are cords r', that are kept in place by grooves in the rollers.

R is a guide or apron attached to the sides of the frame, to guide the pressed cut hay from the cylinders onto the carrier.

Along the cylinder F is fitted or dovetailed in a strip of lead or like material, as shown at h'. This is so placed that as the cylinders are revolved the blade J will come against it, so that the edge of the blade will not be dulled or injured. The cylinders turn in the direction of the arrows.

In operating this machine the hay or straw is thrown into the hopper B, when it is drawn down between the cylinders F and F', where it is pressed and passed between the cylinders F and H onto the guide R, by the auxiliary action of the cutter-head, until the blade J comes round and cuts it off, and it will be cut off in strips of equal length, as it is cut regularly at every revolution of the cylinders at the same place, and discharged onto the carrier prepared for baling. The end P' of the carrier can be raised or lowered into any position, as may be desired.

I am aware that compressing cylinders, or rollers have been in operation separately and combined with a knife or cutters directly attached thereto and used for various purposes; but what distinguishes my improvement is the arrangement of compressing-cylinders superimposed above a revolving cutter-head and auxiliary knife, by which the material is pressed, cut, and conveyed, in conjunction with guide R, to the carrier P.

What I claim as my improvement, and desire to secure by Letters Patent, is—

1. The cylinders F and F', in combination with the cutter-head H and blade J, when arranged as and for the purpose set forth.

2. The carrier or apron P and guide R, in combination with the cutter-head and hopper, as and for the purpose set forth.

S. COLAHAN.

Witnesses:
W. H. BURRIDGE,
A. W. McCLELLAND.